Jan. 20, 1970   H. HOELLE ET AL   3,490,424
PRESSURE-INDUCTANCE VALUE TRANSDUCER
Filed July 18, 1968   2 Sheets-Sheet 1
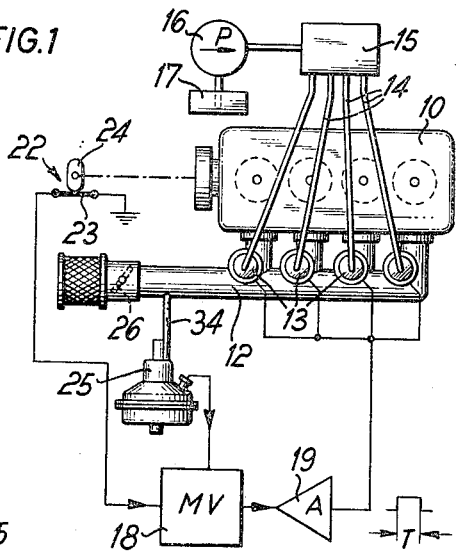
FIG. 1
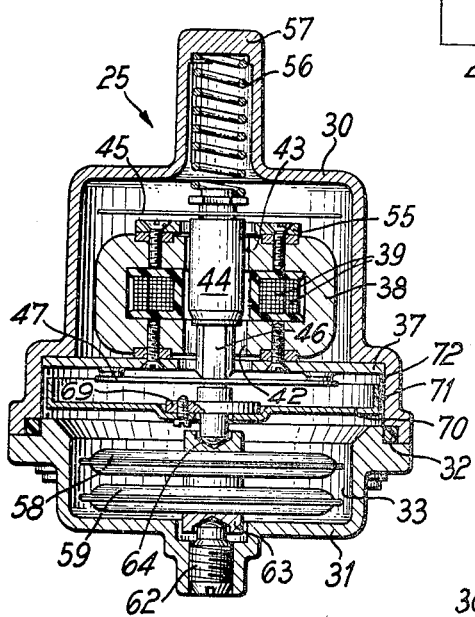
FIG. 2
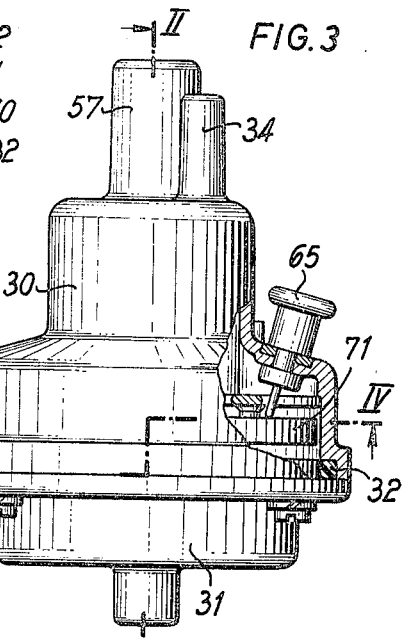
FIG. 3
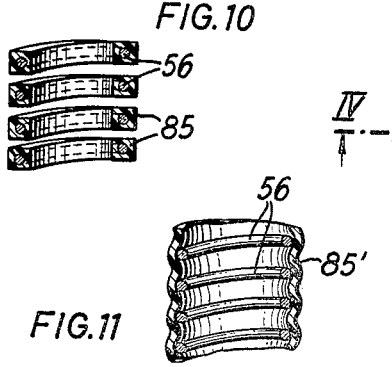
FIG. 10
FIG. 11
INVENTORS:
Hermann HOELLE
Wilhelm KIND
Hermann SCHOLL
BY [signature]
their ATTORNEY Jan. 20, 1970  H. HOELLE ET AL  3,490,424
PRESSURE-INDUCTANCE VALUE TRANSDUCER
Filed July 18, 1968  2 Sheets-Sheet 2
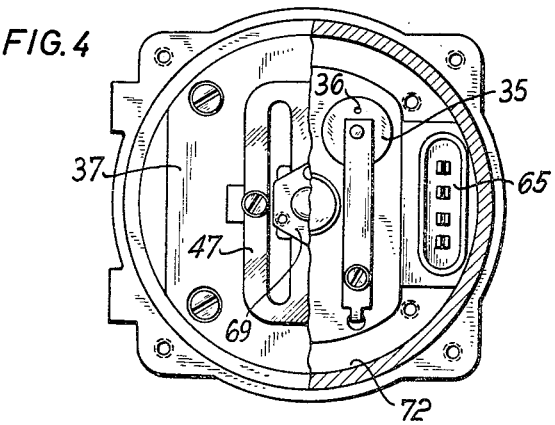
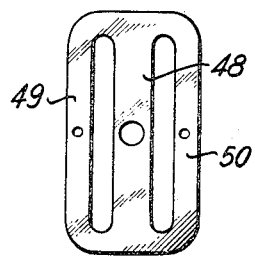
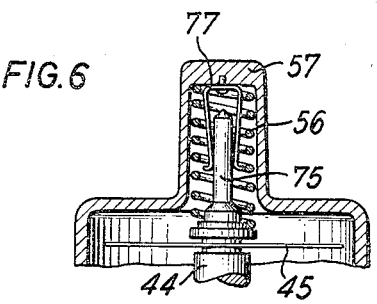
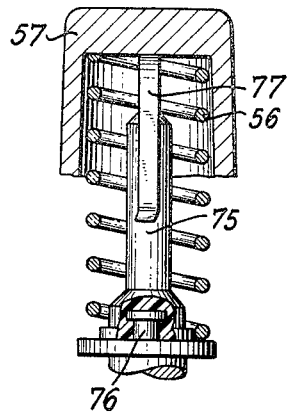
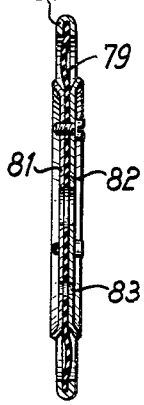
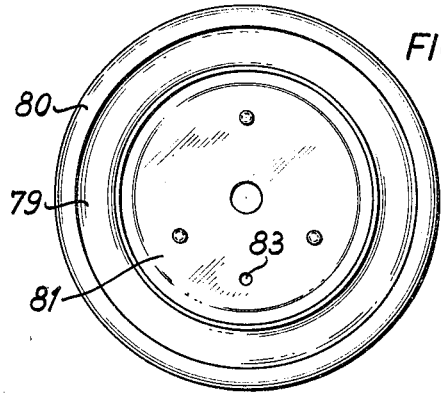
INVENTORS:
Hermann HOELLE
Wilhelm KIND
Hermann SCHOLL
BY
their ATTORNEY

United States Patent Office 3,490,424
Patented Jan. 20, 1970

3,490,424
PRESSURE-INDUCTANCE VALUE TRANSDUCER
Hermann Hoelle, Stuttgart-Kaltental, Wilhelm Kind, Hallstadt, near Bamberg, and Hermann Scholl, Stuttgart, Germany, assignors to Robert Bosch G.m.b.H., Stuttgart, Germany, a limited liability company of Germany
Filed July 18, 1968, Ser. No. 745,912
Claims priority, application Germany, July 22, 1967,
B 93,613
Int. Cl. F02b *33/30;* F02m *7/00*
U.S. Cl. 123—119                                12 Claims

ABSTRACT OF THE DISCLOSURE

To control electronic apparatus in a fuel injection system for internal combustion engines, an inductance value depending on vacuum in the intake manifold of the engine is obtained by a pressure transducer in which an iron core bears on a wall of an evacuated chamber to shift position with pressure change, and thus affect the inductance of a coil surrounding the core; to prevent oscillations in the core, a damping arrangement is connected to a pin which may be in the form of a leaf spring bearing against a plastic extension connected to the core to provide for sliding friction, a pneumatic dashpot-type damping, or interposition of frictional connecting elements between the movable part of the transducer and the housing.

---

The present invention relates to a transducer and more particularly to a pressure transducer converting pressure changes obtained from the intake manifold of an internal combustion engine into inductance changes of a coil.

Internal combustion engines having a fuel injection system, in which the amount of fuel to be injected depends on the vacuum in the intake manifold, require a transducer apparatus which is sensitive to the vacuum in the intake manifold and converts changes in this vacuum to a parameter which can affect the electrical characteristics of the injection system. In particular, such a fuel injection system may include an electronic switch which controls the time of opening of a fuel injection valve, the switching time itself being dependent on an inductance in the electronic circuit, the value of which varies in dependence on the intake manifold vacuum. The pressure transducer thus delivers an output signal which is to correspond to variations in intake manifold pressure.

The internal combustion engine, taking in air through the intake manifold, causes periodic variations in pressure. At certain speeds of the engine, the pressure variations which are transmitted to the pressure transducer may cause resonant oscillations to occur within the transducer. Such resonant oscillations may also be caused by motion of the vehicle chassis, as well as by pulses and stray ripples in the electrical system. Such oscillations occurring in the transducer are of course undesirable, because they result in non-linear transfer characteristics of the transducer, that is in distortion of a transducer output with respect to the measured input value, so that the amount of fuel injected by the fuel injection system may be incorrect.

It is an object of the present invention to provide a pressure transducer of simple construction, and in which distortion of output values is eliminated.

SUBJECT MATTER OF THE PRESENT INVENTION

Briefly, in accordance with the present invention, a pressure transducer of known construction is provided with a damping arrangement which acts on the movable element within the pressure transducer, typically on the movable iron core therein, to dampen movement of the movable element.

The damping means within the pressure transducer may, for example, include a frictional damping arrangement. In accordance with a feature of the invention, a thermoplastic part is in sliding, rubbing engagement with a spring member, such as a leaf spring, to dampen out unwanted oscillations. Such a damping arrangement has been found to have long useful life as well as an even damping characteristic over a long period of time. A simple form of construction includes a resin, for example a polyacetyl resin in the form of a pin, or rod, connected to a movable part within the transducer, and rubbing between a pair of leaf springs, bowed towards each other and bearing against the resin pin.

The damping arrangement may also be constructed as a pneumatic damper, for example in the form of a dashpot, which has the advantage that the resistance of damping at low speeds of the moving element is almost zero, so that there is little hysteresis, or lag, in response as would be the case with frictional arrangements.

The structure, organization, and operation of the invention will now be described more specifically with reference to the accompanying drawings, wherein:

FIG. 1 is a schematic form of a fuel injection system for an internal combustion engine;

FIG. 2 is a vertical cross-sectional view through a transducer along line II—II of FIG. 3;

FIG. 3 is a side view of the transducer, partly in section;

FIG. 4 is a section through the transducer along line IV—IV of FIG. 3;

FIG. 5 is a top view of a leaf spring utilized in the transducer;

FIG. 6 is a partial vertical cross-sectional view illustrating an embodiment of a damping arrangement;

FIG. 7 is an enlarged partial view similar to FIG. 6;

FIG. 8 is top view of another embodiment of the invention;

FIG. 9 is a cross-sectional view of the disc of FIG. 8;

FIG. 10 is a partial cross-sectional view of a spring construction illustrating another embodiment of the damping arrangement; and FIG. 11 is a partial vertical view of a spring with a mantle, illustrating another embodiment of the present invention.

Referring now to FIG. 1: A 4-cylinder internal combustion engine 10, having an intake manifold 12, has at the inlet stubs from the intake manifold, leading to the cylinders, fuel injection valves 13 interposed, to which fuel is conducted, under pressure, over lines 14, from a distribution tank 15. A pump 16 pumps fuel under pressure from a tank 17; a constant pressure, and overpressure valve, not shown, provides for an even pressure in distribution tank 15. The opening duration of the injection valve 13 thus will correspond always to a predetermined quantity of fuel. Pump 16 may be driven from an electric motor, not shown.

Each of the injection valves 13 is operated by an electromagnet. Current is supplied to the electromagnet by an electronic control system which, in essence, consists of a multivibrator circuit 18 and an amplifier 19, only schematically illustrated. The pulse time, that is the duration of the pulses derived from multivibrator 18, and schematically indicated by the graph at the right of FIG. 1, and shown as T, is determined by the vacuum in the intake manifold 12. The occurrence of the pulses themselves is controlled by a pulse generator 22, illustrated as a switch contact 23 operated by a double-rise cam 24, driven from the cam shaft of the engine 10. Thus, multivibrator 18 will supply two pulses from each revolution of the cam shaft, which pulses control the opening of the injection valves 13.

The pulse duration T of the output pulses from multivibrator 18 is dependent on the circuit parameters of the multivibrator. Transducer 25 includes an inductance, the value of which changes in accordance with the vacuum in intake manifold 12, so that pulse duration T is controlled thereby. The control is such, that with high vacuum (throttle 26 in the intake manifold being closed) the pulse duration T is short so that only little fuel is injected; when the vacuum is low (throttle 26 being open) the impulse period is increased and thus more fuel will be injected.

Transducer 25, itself, is illustrated in FIGS. 2–4. It includes a housing having two housing parts 30, 31, which interlock and are sealed together by means of an O-ring 32, so that the space 33 within the housing is hermetically sealed from ambient air. An inlet line 34 (FIG. 3) connects space 33 with inlet manifold 12 over a relief valve 35 (FIG. 4) and a small bore 36 formed therein. The check valve 35 is so adjusted that it opens upon a pressure differential of, for example, 0.05 kg./cm.$^2$.

A cross plate or disc 37, secured in housing 30 supports an iron armature 38, having a cross sectional area in the form of a double-U and is preferably made similar to a toroid. Iron armature 38 encloses a coil 39, having a pair of separate windings, and connected into the circuit of multivibrator 18. The armature 38, as its faces, is formed with bores 42, 43. An iron core 44 is axially movable within bores 42, 43, and having a slight amount of radial air gap. The iron core (with respect to FIG. 2) is screw-connected with a leaf spring 45 at its upper end. Its lower face is connected to a shaft 46 consisting of non-magnetic material, for example brass, which in turn is screw-connected with a leaf spring 47.

The shape of the leaf spring 47, identical to that of leaf spring 45, is best seen in FIG. 5. It has a cross sectional aspect of a double-M so that radial motion of iron core 44 finds substantial resistance, whereas core 44 may readily move axially. Thus, iron core 44 may move axially without frictional interference and will change its position already upon small changes in pressure within intake manifold 12. The permeability of the iron armature 38 and of iron core 44 has only little influence on the inductivity of coil 39, due to the small radial air gap of from 0.1 to 0.5 mm. between core 44 and armature 38.

As seen in FIGS. 2, 4 and 5, leaf spring 47 (and, spring 45, respectively) is connected over its central leg 48 with core 44. The two outer legs 49, 50 are screw-connected with cross plate 37 over spacers. Likewise, spring 45 is connected, by means of spacers to a plate 55 which, in turn, is secured to iron armature 38.

A helical spring 56 is located in a well 57 formed in housing 30. It is pre-stressed and presses the core 44 against a pair of evacuated vacuum chambers 58, 59, which, in turn, are supported from a seat 63 bearing against a screw 62 screwed into housing part 31. Bearing unit 63 has a matching bearing part 64 at the other side thereof, against which the brass rod 46 connects, so that the vacuum chambers 58, 59 are floatingly connected to the core 44, and may assume their proper axial position without placing a radial load on the moving core. Assembly of this device is simple.

Electrical connection 65 is placed in the upper housing portion 30, air-tight, and suitably connected with the terminals of coil 39.

The connection line 34 between the intake manifold 12 and the pressure transducer 25 is, preferably, at least 50 centimeters long. Nevertheless, operation of the pressure transducer in the vicinity of the internal combustion engine causes shocks and vibration which, together with periodic pressure variations in the intake manifold act on iron core 44 to cause resonant vibrations of the iron core 44 at certain frequencies.

In accordance with the present invention, means are provided to dampen spurious and undesired vibrations or oscillations.

Oscillations of the core 44 may be dampened by providing a flange-like enlargement 69 on shaft 46 (FIG. 2) and arranging thereon a disc 70, the edge of which is bent parallel to the wall of the housing 30, that is upwardly. Bent-up edge 71 is only slightly smaller than the inner diameter of wall 72 of housing part 30 which, as seen in FIG. 4, is circular (in FIG. 4, the disc 70 has been omitted for clarity of illustration). Thus, only a small air gap will be present between edge 71 and inner wall 72.

OPERATION

If, due to shock or vibration, iron core 44 is moved upwardly, in axial direction (FIG. 2), pressure within housing portion 30 will increase, and pressure within housing part 31 will decrease. This pressure difference can equalize over the narrow air gap between edge 71 and inner wall 72. This air gap is sufficiently small to impede rapid air flow, thus damping movement of core 44 effectively. Disc 70 causes rapid response of the transducer 25 upon pressure changes in intake manifold 12. If, for example, the pressure in intake manifold 12 increases upon opening of throttle 26, then this pressure is transmitted to the space above disc 70 within housing 30, via the valve 35. The pressure in housing part 31, that is below disc 70, initially remains the same as before. A pressure difference thus will act on disc 70 and cause a force, directed downwardly, which causes compression of the vacuum chambers 58, 59, causing rapid movement of the iron core 44 downwardly, and increase in inductivity of windings 39, in turn causing an increase in injection duration T (FIG. 1) which in turn effects injection of a greater amount of fuel. Upon equalization of pressure due to air flow between edge 71 and inner wall 72, the higher pressure acts directly on vacuum chambers 58, 59 and compresses these chambers, thus retaining iron core 44 in position.

If throttle 26 is closed, the pressure in intake manifold 12 drops (that is, the vacuum increases) and the reverse sequence will occur, so that iron core 44 is displaced upwardly. Disc 70, again, dampens the movement.

FIGS. 6 and 7 illustrate another embodiment to dampen axial movement of iron core 44. Only well 57 of housing part 30, as well as spring 56 and spring 45, to which core 44 is attached, are illustrated. The remainder of the construction is identical to that of FIGS. 2–5, except that disc 70 may be omitted.

A pin, or rod-like projection 75, forming an axial extension of core 44 and secured thereto, extends into well 57 and co-axially within spring 56. Pin 75, as illustrated in FIG. 7, consists of a plastic resin material, applied to a core stub 76 secured to iron core 44. Polyoxymethylene, known under the trademark Delrin, is particularly suitable. A pair of leaf springs, for example formed of a single U- shaped leaf spring element secured at its center at the bottom of well 57 is arranged to surround the plastic pin 75 to frictionally engage the pin and slide or rub thereagainst. Spring 57, as illustrated, may be riveted in the center to the well, or crimped into a notch formed in well 57. The force with which the two legs of spring 77 bear against pin 75 is so arranged that the iron core 44 will move axially only when a certain minimum force has been overcome. Such a minimum force may, for example, be about 20–30 grams. Spring 77 preferably consists of a bronze alloy which results in reliable continuity of frictional force, even after extended use.

Another embodiment of the invention is illustrated in connection with FIGS. 8 and 9, and using a membrane. A thin, circular plastic foil 79, connected at its outer edge to a ring 80, is secured by means of a pair of central sheet-metal discs 81, 82 to shaft 46. An opening 83 is formed through the metal and plastic discs to enable pressure differential equalization, and acting at the same time as a throttle. The membrane in accordance with FIGS. 8 and 9 is utilized instead of disc 70 in a construction similar to that of FIGS. 2–4. Discs 81, 82 are screwed on flange 69 instead of disc 70. Ring 80 is either pressed into the inner wall 72, or screwed between housing parts 30, 31. Membrane 79 thus separates housing parts 30, 31 and forms a pair of separate chambers, interconnected over the throttle hole 83. Upon axial motion of core 44, air must flow from one side of membrane 79 through throttle opening 83, plus damping movement of core 44.

Use of the membrane in accordance with FIGS. 8 and 9 has the advantage that the inner wall 72 need not be accurately machined, as is the case in accordance with the embodiment of FIGS. 2–5. The degree of damping may be accurately predetermined by the size of hole 83.

FIG. 10 illustrates another embodiment of the present invention, in which spring 56, illustrated in greatly enlarged scale, is covered by a damping layer 85 consisting of rubber or plastic. Preferably, a plastic having a high damping effect is used, which can be applied to spring 56 by dipping the spring 56 into the plastic solution. FIG. 11 illustrates another embodiment, in which a mantle of plastic or rubbery material 85' surrounds spring 56. Movement of core 44, causing compression of the spring 56, causes movement of the individual helices of spring 56 against mantle 85', thus damping such movement.

We claim:

1. Pressure-inductance transducer to convert pressure changes into changes in inductance of a coil comprising
   a housing;
   pressure-responsive means mounted in said housing and changing a physical dimension upon change in pressure;
   a coil and an iron core assembly in said housing, said core being movable in said housing and in contact with said pressure-responsive means and changing its relative position with respect to said coil upon change of said dimension;
   and damping means located in said housing acting on said core and damping relative movement of said core with respect to said coil.

2. Transducer according to claim 1, wherein said damping means is a frictional damping means.

3. Transducer according to claim 2, wherein said friction damping means includes a plastic element and a spring element in frictional engagement against said plastic element, one of said elements being connected to said core and the other to said housing.

4. Transducer according to claim 3 wherein said plastic element is a thermoplastic rod, and said spring element is a double leaf spring resiliently bearing against opposite sides of said rod.

5. Transducer according to claim 3, wherein said plastic element is formed of polyoxymethylene.

6. Transducer according to claim 3, including a helical spring bearing against said core and retaining said core in position and in contact against said pressure-responsive means;
   said plastic element being an elongated extension on said core extending centrally into said helical spring;
   and said spring element being a U-shaped leaf spring located within said helical spring, the legs of said U frictionally, resiliently engaging the sides of said plastic element.

7. Transducer according to claim 1, wherein said damping means is a pneumatic damping means.

8. Transducer according to claim 7, including a disc mounted to be movable with said iron core, said disc fitting within said housing with slight clearance to leave only a small air gap between said disc and said housing.

9. Transducer according to claim 1, wherein said damping means includes a flexible disc mounted to be movable with said iron core, said disc being mounted in said housing and flexing upon change of said dimension.

10. Transducer according to claim 9, including an opening formed in said disc permitting gradual equalization of pressures above and below said disc through said opening to additionally dampen movement of said core.

11. In an internal combustion engine, an intake manifold and a fuel injection system including fuel injection means, electronic means controlling the amount of fuel to be injected by said injection means, and transducer means sensing the vacuum in the intake manifold and providing an output signal representative of said vacuum to said electronic control means, the improvement comprising
    a housing;
    vacuum responsive means mounted in said housing and changing a physical dimension upon change in pressure;
    a coil and an iron core assembly in said housing, said core being movable in said housing and in contact with said sensing means and changing its relative position with respect to said coil upon change of said dimension;
    and damping means located in said housing acting on said core and damping relative movement of said core with respect to said coil.

12. Engine according to claim 11, wherein said damping means includes a pair of elements slidable with respect to each other and resiliently engaging each other, one of said elements being connected to move in accordance with change in the vacuum of said intake manifold and the other of said elements being fixed.

References Cited

UNITED STATES PATENTS 2,918,911   12/1959   Guiot.
3,452,727   7/1969   Hoelle et al.

LAURENCE M. GOODRIDGE, Primary Examiner

U.S. Cl. X.R.

123—32, 139, 140